United States Patent
Okada et al.

(10) Patent No.: US 6,220,227 B1
(45) Date of Patent: Apr. 24, 2001

(54) FUEL SUPPLY DEVICE

(75) Inventors: Yoshihiro Okada, Yokohama; Koji Takahashi, Gunma; Takashi Hashimoto; Taiki Aoyama, both of Kanagawa, all of (JP)

(73) Assignees: Unisia Jecs Corporation, Atsugi; Nissan Motor Co., Ltd., Yokohama, both of (JP)

( * ) Notice: Subject to any disclaimer, the term of this patent is extended or adjusted under 35 U.S.C. 154(b) by 0 days.

(21) Appl. No.: 09/537,510

(22) Filed: Mar. 29, 2000

Related U.S. Application Data

(62) Division of application No. 09/142,223, filed as application No. PCT/JP98/00504 on Feb. 6, 1998.

(30) Foreign Application Priority Data

Feb. 7, 1997 (JP) .................................................. 9-39887

(51) Int. Cl.⁷ .................................................. F02M 37/04
(52) U.S. Cl. ........................................... 123/509; 123/510
(58) Field of Search ................................. 123/509, 510

(56) References Cited

U.S. PATENT DOCUMENTS

| 5,511,957 | 4/1996 | Tuckey et al. ................. 417/313 |
| 5,636,616 | 6/1997 | Okane et al. .................. 123/510 |
| 5,649,514 * | 7/1997 | Okada ........................... 123/514 |
| 5,758,627 | 6/1998 | Minagawa et al. ............. 123/509 |
| 5,762,047 | 6/1998 | Yoshioka et al. .............. 123/514 |
| 5,769,061 | 6/1998 | Nagata et al. .................. 123/509 |
| 5,782,223 * | 7/1998 | Yamashita et al. ............. 123/510 |
| 5,785,032 * | 7/1998 | Yamashita et al. ............. 123/509 |
| 5,881,669 | 3/1999 | Brown et al. .................. 123/514 |
| 5,894,857 | 4/1999 | Takaki et al. .................. 123/514 |
| 5,958,237 | 9/1999 | Cort et al. ..................... 123/514 |

FOREIGN PATENT DOCUMENTS

| 195 35 668 | 3/1996 | (DE) . |
| 198 24 246 | 12/1998 | (DE) . |
| 0 754 483 | 1/1997 | (EP) . |
| 0 969 200 | 1/2000 | (EP) . |
| 2-80765 | 6/1990 | (JP) . |
| 8-323122 | 1/1996 | (JP) . |
| 8-232792 | 9/1996 | (JP) . |
| 2612657 | 2/1997 | (JP) . |
| 9-32678 | 2/1997 | (JP) . |
| 9-32679 | 2/1997 | (JP) . |

* cited by examiner

Primary Examiner—Thomas N. Moulis
(74) Attorney, Agent, or Firm—Foley & Lardner

(57) ABSTRACT

A fuel filter 10, constructing a supply unit 8, comprises a filter case 11 having an electric conductivity and a filter element 14. The filter case 11 is formed with an inside wall portion 11A and an outside wall portion 11B into a U shape in lateral cross section, so as to enlarge a contact area contacting with fuel in a fuel tank. The fuel discharged from the fuel pump 9 flows into a fluid chamber 15 of the fuel filter 10, and then be supplied from a fuel supply conduit 20 through a fuel flow passageway 12A to the outside. At this time, static electricity charged in the filter case 11 is discharged through its outer peripheral surface into the surrounding fuel having a slight electric conductivity.

2 Claims, 10 Drawing Sheets

FUEL SUPPLY DEVICE

This application is a divisional of application Ser. No. 09/142,223, filed as application No. PCT/JP98/00504 on Feb. 6, 1998.

TECHNICAL FIELD

The present invention relates to a fuel supply device which is provided within a fuel tank for example in an automotive vehicle, and can be suitably applied to supply fuel into the engine.

BACKGROUND ART

Generally, a fuel supply device consisting of a fuel tank in which fuel is stored, a fuel pump disposed in the fuel tank to discharge the fuel in the fuel tank to the exterior thereof, and a fuel filter provided in the fuel tank together with the fuel pump to purify the fuel discharged from the fuel pump, is well known.

In this sort of conventional fuel supply device, in order to feed the fuel in the fuel tank within toward the engine, the fuel pump and the fuel filter are disposed in the fuel tank under a condition where the fuel pump and the fuel filter are integrally installed on a mounting bracket made of synthetic resin, and contacts the fuel, such as gasoline, stored in the fuel tank.

During operation of the engine, the fuel within the fuel tank is discharged by means of the fuel pump, and flows through the fuel filter for purification, and then fed into the outside of the fuel tank toward each of fuel injection valves of the engine.

On the other hand, the fuel filter is constructed by a filter case installed on the mounting bracket, and a filter element disposed in the filter case. A fuel flow passageway is defined between the filter case and the filter element. The fuel, discharged out of the fuel pump and entering into the fuel filter, is purified by way of the filter element, while flowing through the above-mentioned flow passageway.

In the previously-noted prior art, the fuel, which is discharged from the fuel pump during operation of the engine, enters into the fuel filter, and passes through the filter element of fine mesh. Thus, there is a tendency turbulent flow to occur within the fuel filter, since the fuel flow is violently disturbed just before and after the filter element. As a result, static electricity builds up in the filter case of the fuel filter due to the filter case put into contact with the fuel.

However, for the purpose of compactly disposing the filter case in the fuel tank, the filter case is installed on the mounting bracket made of synthetic resin together with the fuel pump, so that the filter case is kept in an electrically insulated state within the fuel tank.

For the reasons set forth above, the prior art has a problem that the static electricity charged in the filter case due to friction between the filter case and the fuel is gradually stored and built up.

DISCLOSURE OF THE INVENTION

It is, therefore in view of the previously discussed disadvantages of the prior art, an object of the invention to provide a fuel supply device which is capable of relieving the static electricity to the exterior and preventing the static electricity from being stored in a filter case to enhance its reliability, even when the filter case is charged with static electricity due to friction with the fuel.

In order to accomplish the aforementioned objects of the present invention, the present invention can be applied to a fuel supply device including a fuel tank storing fuel, a fuel pump disposed in the fuel tank to discharge the fuel in the fuel tank toward outside thereof, and a fuel filter disposed in the fuel tank together with the fuel pump to purify the fuel discharged from the fuel pump, in which the fuel filter is constructed by a filter case provided in the fuel tank, and a filter element disposed in the filter case.

The invention described in claim 1 is characterized in that the above-mentioned filter case is made of a material having an electric conductivity and formed with an inside wall portion and an outside wall portion respectively being in contact with fuel in the fuel tank, and that a filter accommodation space is defined between the inside wall portion and the outside wall portion to accommodate the filter element therebetween.

According to the aspect described above, the fuel and the filter case are contacted with each other with a large contact area by contacting the filter case, which has an electric conductivity, with the fuel surrounding the inside wall portion and the outside wall portion, and thus static electricity charged in the filter case is able to be released to the fuel therearound by contacting with the fuel flowing through the filter accommodation space. In this case, the fuel within the fuel tank has the electric conductivity owing to moisture mixed with the fuel. In the event that the filter case is charged with static electricity, the static electricity charged in the filter case can be escaped into the fuel within the fuel tank through at least the inside wall portion and the outside wall portion, by utilizing the electric conductivity of the fuel.

In the invention described in claim 2, the above-mentioned filter case Is formed so that its lateral cross-section is a substantially U shape, in the same manner as the filter element, and also in such a manner as to permit the fuel to flow into the inside wall portion at a position opposed to the outer periphery of the fuel pump.

In this manner, the outside wall portion and the inside wall portion of the filter case are curved and formed into a substantially U shape, thereby increasing the surface area of these wall portions. Under a condition where the filter case and the fuel pump are integrally assembled to each other, the fuel can be flowed into the inside wall portion of the filter case. Under this condition, the filter case can be contacted with the fuel within the fuel tank with the wide contact area.

Furthermore, in the invention recited in claim 3, the previously-noted filter case is formed as a double cylinder construction, so that the above-mentioned inside wall portion surrounds the outer periphery o the fuel pump with an aperture in a cylindrical fashion, and so that the outside wall portion surrounds the outer periphery of the inside wall portion through the filter element in a cylindrical fashion.

Hereby, the inside wall portion and the outside wall portion of the filter case are formed in such a manner as to have a cylinder diameter greater than that of the fuel pump, thus increasing the surface area of them. Under the condition where the filter case and the fuel pump are integrally assembled to each other, the fuel can flow through the aperture defined between the inside wall portion of the filter case and the outer periphery of the fuel pump, and whereby the filter case is able to contact with the fuel within the fuel tank with a wide contact area. On the other hand, in the invention described in claim 4, the previously-noted fuel filter is formed of a material having an electric conductivity, and also composed of a filter case provided in the fuel tank and a filter element disposed in the filter case. The filter case is formed with a conducting member by way of which the static electricity charged in the filter case is escaped into the exterior.

Hereby, in the case that the filter case is charged with static electricity, such static electricity can be released from the filter case through the conducting member to the earth, for example. This prevents the filter case from being held in the charged state with electricity.

Also, in the invention described in claim 5, the previously-noted conducting member is constructed by a lead wire through which the static electricity charged in the filter case is escaped to the upper side of the fuel tank.

Hereby, the static electricity charged in the filter case can be escaped from the lead wire through the upper side of the fuel tank to the exterior, such as the earth, thereby preventing the filter case from being held in the charged state with electricity.

Also, in the invention described in claim 6, the previously-noted conducting member is connected at one end to the outside wall surface of the filter case, and the other end is formed as a conducting member vertically suspended and coming down close to the bottom portion of the fuel tank.

Hereby, the static electricity charged in the filter case can be escaped through the outside wall surface and the conducting member into the surrounding fuel. Additionally, for instance, if the moisture is accumulated in the bottom portion of the fuel tank, the static electricity charged in the filter case can be escaped from the tip end of the conducting member into the moisture.

Furthermore, according to the invention described in claim 7, the fuel supply device as claimed in claim 4 is characterized in that the conducting member is connected at one end to the outside wall surface of the filter case, and the other end is constructed by a conducting member being in contact with the bottom portion of the fuel tank.

Hereby, for example if the fuel tank made of metal is used, the static electricity charged in the filter case can be escaped from the conducting member through the fuel tank into the exterior for example to the earth.

On the other hand, according to the invention described in claim 8, the previously-discussed fuel filter is formed of a material having an electric conductivity, and also composed of a filter case provided in the fuel tank and a filter element disposed in the filter case, and a return conduit is provided in the fuel tank for returning part of the fuel discharged from the fuel pump into the fuel tank. The outlet of the return conduit is designed to open at a position that the fuel returned into the fuel tank comes into contact with the side wall surface of the filter case.

Hereby, the static electricity charged in the filter case can be escaped through the fuel, which is returned through the return conduit, into the fuel within the fuel tank, thereby preventing the filter case from being kept in the charged state with electricity.

DESCRIPTION OF THE PREFERRED EMBODIMENTS

Hereunder, the embodiments made according to the invention is described in detail by reference to the attached drawings.

Figure 1:
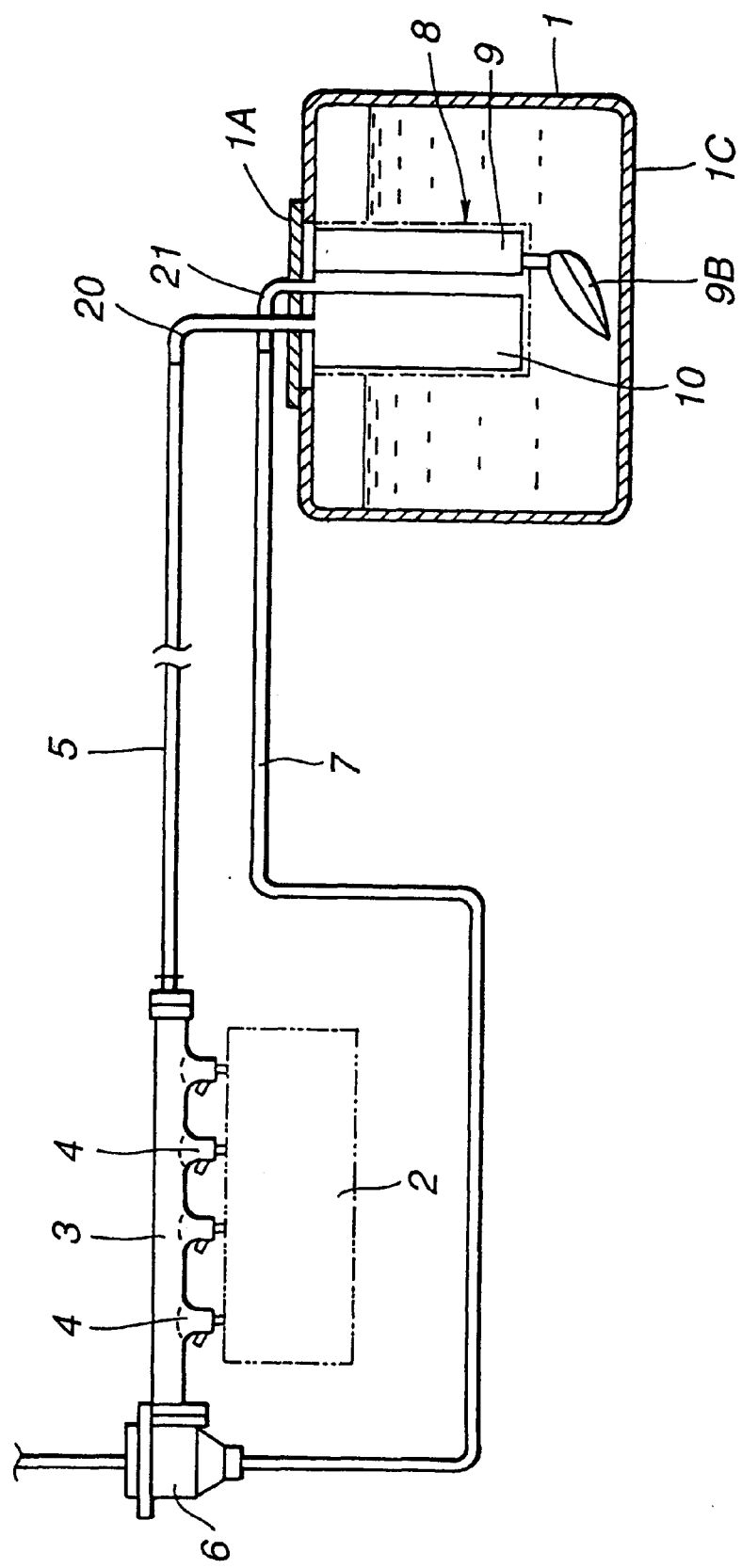
FIG. 1 is a system block diagram illustrating the fuel supply device of the first embodiment.
Figure 2:
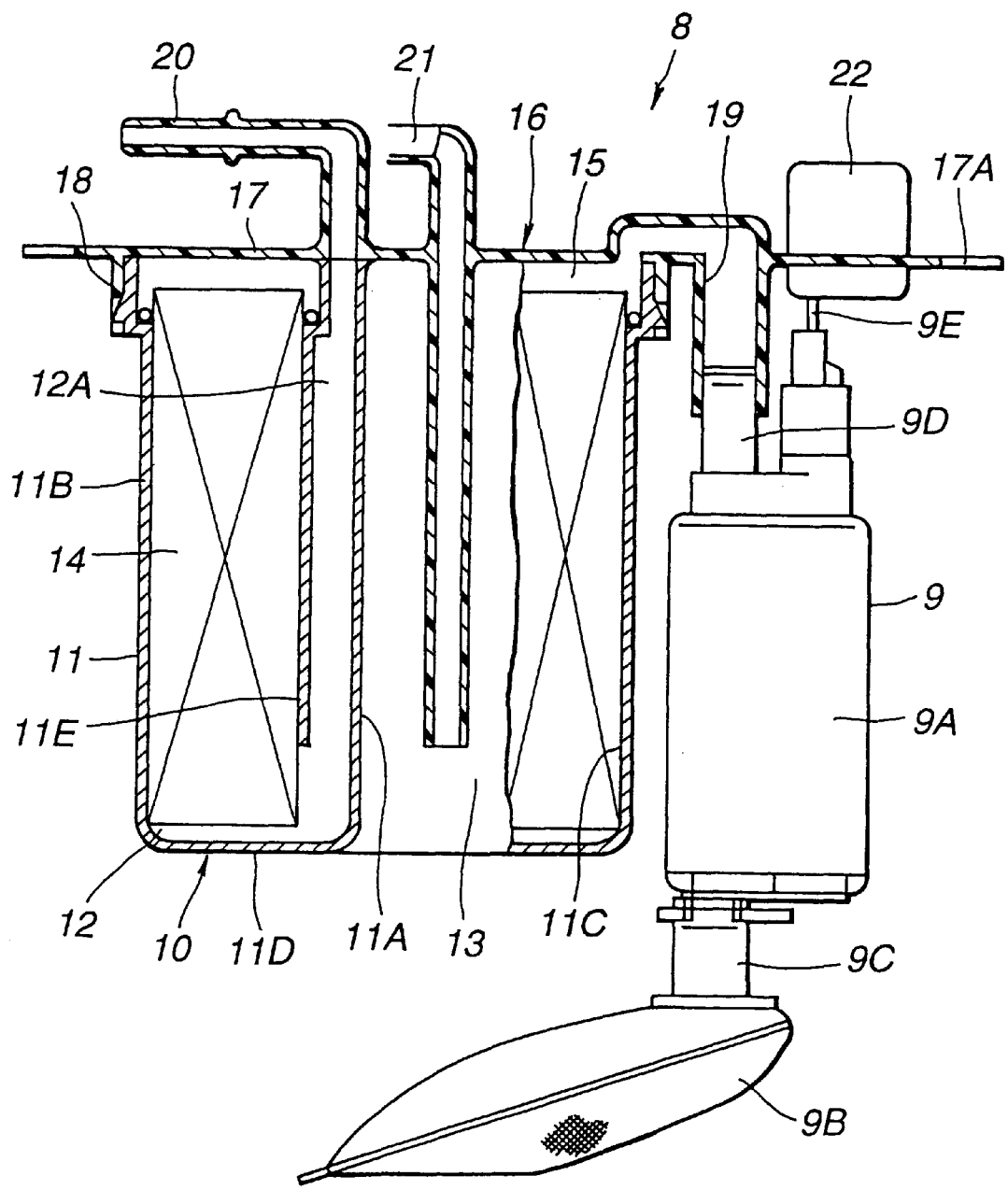
FIG. 2 is a longitudinal cross sectional view taken along the line II—II shown in FIG. 3 and corresponding to an enlarged view of the supply unit of the fuel supply device.
Figure 3:
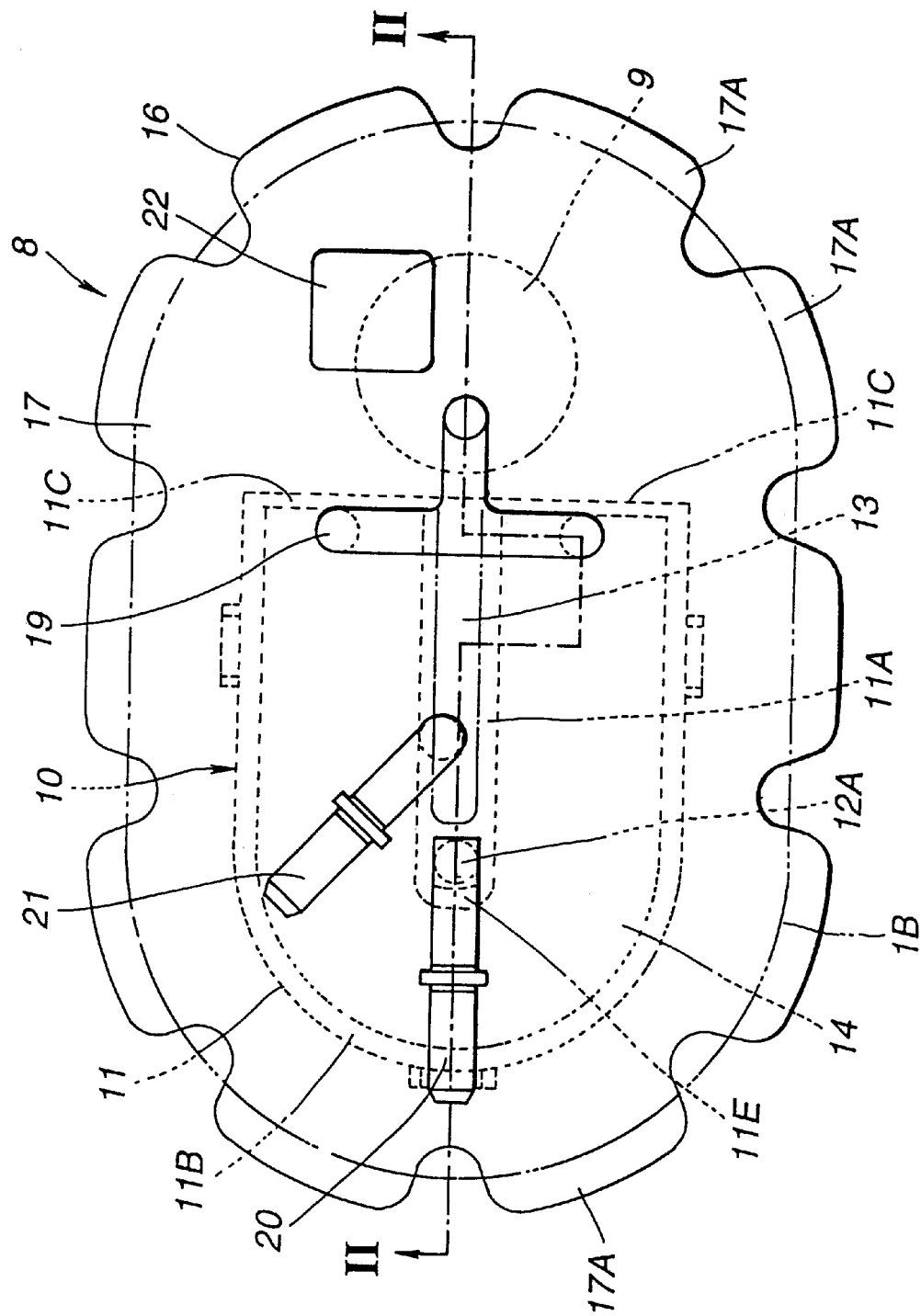
FIG. 3 is a plan view illustrating the supply unit of the fuel supply device of FIG. 2.

In the drawings, FIGS. 1 through 3 show the first embodiment. In this embodiment, the fuel supply device is exemplified in a fuel supply device for an automobile engine.

In the drawings, reference sign 1 denotes a fuel tank in which fuel, such as gasoline, is stored. A supply unit 8, which will be hereinafter described, is provided in the fuel tank for feeding the fuel in the tank within toward the engine 2. A lid plate 1A of the fuel tank 1 is formed with an opening 1B (see FIG. 3) for installing thereon a unit body 16 of the supply unit 8.

On the other hand, commonly, the fuel within the fuel tank is mixed slightly with impurities having an electric conductivity, such as moisture, and thus such the fuel is conditioned in a conducting state. Particularly, the moisture tends to stay to some degree on the bottom portion 1C of the fuel tank 1, while the automotive vehicle is used for a long period of time.

Reference sign 3 denotes a fuel line installed on the engine 2. The fuel line 3 is formed with fuel injection valves 4, 4, . . . , for injecting fuel into the respective engine cylinders. The fuel line 3 is connected at it one end through a line 5 to the fuel supply portion 20 of the supply unit 8, and also connected at the other end through a pressure regulator 6 used for fuel pressure regulation and a return line 7 to a return conduit 21 of the supply unit 8.

Reference sign 8 denotes the supply unit provided in the fuel tank 1. As seen in FIG. 2, the supply unit 8 is constructed by a fuel pump 9, a fuel filter 10, and the unit body 16 on which the previously-noted component parts are installed. As shown in FIG. 1, the supply unit 8 is provided in the fuel tank so that the supply unit is installed on the fuel tank through the unit body 16 and is contact with the fuel within the fuel tank 1.

Reference sign 9 denotes the fuel pump for discharging the fuel in the fuel tank 1 to the exterior. As seen in FIG. 2, the fuel pump 9 is constructed by a pump body 9A formed into a substantially cylindrical shape, a suction port 9C provided at the lower end of the pump body 9A and connected to a filter portion 9B, and a discharge port 9D provided at the upper end of the pump body 9A. The pump body 9A employs a lead wire 9E for supplying electric power from the external power source.

The fuel pump 9 is installed on the unit body 16, the discharge port 9D is fitted into the fuel inlet port 19, and the lead wire 9E is connected to the connector portion 22 of the unit body 16. Under this condition, the fuel of the fuel tank 1 sucked in through the suction port 9C is discharged from the discharge port 9D into the fuel inlet port 19.

Reference sign 10 denotes the fuel filter of the present embodiment, provided for purification of the fuel discharged from the fuel pump 9. As seen in FIG. 2, the fuel filter 10 is constructed by the filter case 11 and the filter element 14, as will be described later.

Reference sign 11 denotes the filter case serving as a casing for the fuel filter 10. The filter case 11 is formed of a synthetic-resin material containing anti-static agent, a metallic material containing anti-static agent, or the like, and materially has an electric conductivity.

Additionally, as seen in FIG. 3, the filter case 11 is constructed by the inside wall portion 11A whose central portion is curved in a substantially U shape in the longitudinal direction, the outside wall portion whose central portion is curved in a substantially U shape in the longitudinal direction, a pair of side wall portions 11C, 11C integrally connecting the inside wall portion 11A with the outside wall portion 11B at the position where the filter case opposes the outer periphery of the fuel pump 9, and a bottom wall portion 11D shown in FIG. 2.

The filter case 11 has a lateral cross section of a substantially U shape, as a whole, and is formed as a casing with a bottom at it lower end and an opening at its upper end. The filter case defines therein a filter accommodation space 12 which is located and defined between the inside wall portion 11A and the outside wall portion 11B for accommodating the filter element 14.

As seen in FIG. 3, also provided midway of the inside wall portion 11A in the longitudinal direction is a partition wall portion 11E projected toward the outside wall portion 11B into the U shape. The partition wall portion 11E defines a vertically-extending fuel flow passageway 12A in the filter accommodation space 12 and between the inside wall portion and the partition wall portion. The fuel flow passageway 12A communicates at its upper end with the fuel supply conduit 20 of the unit body 16, and also communicates at its lower end with the filter element 14 through a space on the bottom wall portion 11D.

Additionally, the filter case 11 is fitted at the upper end into the filter mounting portion 18 of the unit body 16, for installation on the unit body 16. The fuel within the fuel tank 1 enters into and outgoes from the inner space 13 surrounded by the inside wall portion 11A in a substantially U shape. This permits the filter case 11 to contact with the fuel in the fuel tank 1 through the inside wall portion 11A, the outside wall portion 11B, the respective side walls 11C, and the bottom wall portion 11D, with a wide contact area.

Reference sign 14 denotes the filter element accommodated in the filter accommodation space 12 of the filter case 11. Although, when the filter element 14 is conditioned in the non-accommodated state, its lateral cross section is straight, the substantially U-shaped cross section is created by curving the straight element. The side wall surface of the filter element is brought into abutted-contact all around with the inside wall surface of the filter case 11. Also, a fluid chamber 15 is formed within the filter case 11 and is defined at the upper end of the filter element 14 and between the base portion 17 of the unit body 16 and the filter element upper end. The filter element 14 filtrates and purifies the fuel entering into the fluid chamber 15, and then flows out the purified fuel through the lower end of the filter element into the fuel flow passageway 12A.

Reference sign 16 denotes the unit body constructing the housing of the supply unit 8. As seen in FIGS. 2 and 3, the unit body 16 is made of synthetic resin material having an electric insulation property and formed into a substantially oval plate. The unit body is equipped with the base portion 17 formed with a plurality of collared portions 17A, 17A, . . . , circumferentially spaced apart from each other and engaged with the opening 1B of the fuel tank 1, and the filter mounting portion 18 formed into a frame projected downward by a predetermined length from the base portion 17 for installing thereon the upper end of the filter case 11 of the fuel filter 10.

As shown in FIG. 3, the base portion 17 is formed integral with the fuel inlet port 19 which is formed as a substantially T-shaped conduit. As clearly seen in FIG. 2, one end of the fuel inlet port 19 projects downward from the base portion 17, and is connected at its lower end to the discharge port 9D of the fuel pump 9 so that the discharge port is fitted into the inner periphery of the fuel-inlet lower end. The other end of the fuel inlet port 19 is branched in two directions to open into the fluid chamber 15 of the fuel filter 10.

Moreover, as seen in FIG. 2, the base portion 17 is formed with the fuel supply conduit 20 which is formed into a L shape, extending upwards, and communicates with the fuel flow passageway 12A of the filter case 11, and the return conduit 21 which is L-shaped, extending upwards at the upper end in the same manner as the fuel supply conduit 20, and the lower end extends downwards from the base portion 17 through the inner space 13. Also, the base portion 17 is formed with the connector portion 22 for the fuel pump 9. The connector portion 22 is connected through the lead wire or the like to the electric power circuitry (not shown) provided in the exterior of the fuel tank 1.

As regards the unit body 16, the respective collared portions 17A of the base portion 17 are engaged with the outer surface of the opening 1B of the fuel tank 1, indicated by the one-dotted line of FIG. 3, and are fixedly connected to the lid plate 1A of the fuel tank 1 by means of locking pins installed between the respective two adjacent collared portions 17A to prevent the respective collared portions from falling out from the opening.

With the previously-described arrangement, the fuel supply device of the present embodiment operates as follows.

First of all, when the fuel pump 9 shown in FIG. 2 is driven, the fuel of the fuel tank 1, sucked in from the suction port 9C, is discharged from the discharge port 9D of the fuel pump 9 into the fuel inlet port 19 of the unit body 16, and then flows into the fluid chamber 15 of the fuel filter 10.

Thereafter, the fuel flows through the filter element 14 from the upper end to the lower end, and thus filtered and purified, and then flows along the bottom wall portion 11D of the filter case 11 through the fuel flow passageway 12A into the fuel supply conduit 20, and further supplied from the fuel supply conduit 20 into the exterior of the fuel tank 1 within toward the engine 2.

Also, the fuel is supplied through the line 5 shown in FIG. 1 into the fuel line 3, and then injected into the cylinders of the engine 2 via the respective fuel injection valves 4. The fuel pressure of fuel in the fuel line 3 is regulated by means of the pressure regulator 6, and thus surplus fuel is returned through the return line 7 into the return conduit 21 of the supply unit 8, and then returned into the fuel tank 1 via the return conduit 21.

On the other hand, when the fuel, entered into the fuel filter 10, flows from the fluid chamber 15 through the filter element 14 and the fuel flow passageway 12A into the fuel supply conduit 20, the fuel flow produces friction with the inner wall surface of the filter case 11, and whereby the filter case 11 tends to be charged with static electricity.

Hereupon, since the fuel filter 11 are brought into contact with the fuel, stored in the fuel tank 1 and having a slight electric conductivity, through the inside wall portion 11A, the outside wall portion 11B, the respective side wall portions 11C, and the bottom wall portion 11D, the static electricity charged in the filter case 11 can be discharged through the outer surfaces of these wall portions into the fuel within the fuel tank 1.

In this manner, in the present embodiment, the filter case 11 of the fuel filter 10, which is provided in the fuel tank 1, is made of a material having an electric conductivity materially and formed into a substantially U-shape in lateral cross section, and the fuel within the fuel tank 1 can be entered into and outgone from the inner space 13 surrounded by the inside wall portion 11A. Thus, the inside wall portion 11A and the outside wall portion 11B of the filter case 11 can be curved and formed into the U shape, and whereby the surface area of these wall portions can be certainly enlarged, and at the same time the filter case 11 can contact with the fuel within the fuel tank 1 through the inside wall portion 11A, the outside wall portion 11B, the respective side wall portions 11C, and the bottom wall portion 11D, with an adequately wide contact area.

For the reasons discussed above, in the case that the filter case 11 is charged with static electricity due to friction with the fuel flowing through the interior of the filter case, the static electricity charged in the filter case 11 can be effectively escaped through the inside wall portion 11A, the outside wall portion 11B, the respective side wall portions 11C, and the bottom all portion 11D into the fuel prevailing in the fuel tank 1, by virtue of the electric conductivity of the fuel. Accordingly, even when the electric conductivity of the fuel is very small, the static electricity charged in the filter case 11 can be escaped into the fuel with the sufficiently increased contact area between the filter case 11 and the fuel.

Therefore, even when the filter case 11 is charged with static electricity, the device according to the present embodiment can prevent the static electricity from being accumulated in the filter case 11, and whereby the reliability of the fuel supply device can be enhanced.

Additionally, the fuel pump 9 and the substantially U-shaped fuel filter 10 are provided so that the respective side wall portions 11C of the fuel filter 10 are opposed to the outer periphery of the fuel pump 9, and thus there is less undesirable aperture between the fuel filter and the fuel pump, as compared with such a construction that the U-shaped portion of the outside wall portion 11B is opposed to the outer periphery of the fuel pump 9. These component parts can be compactly installed on the unit body 16, and simultaneously the supply unit 8 can be certainly small-sized.

Figure 4:
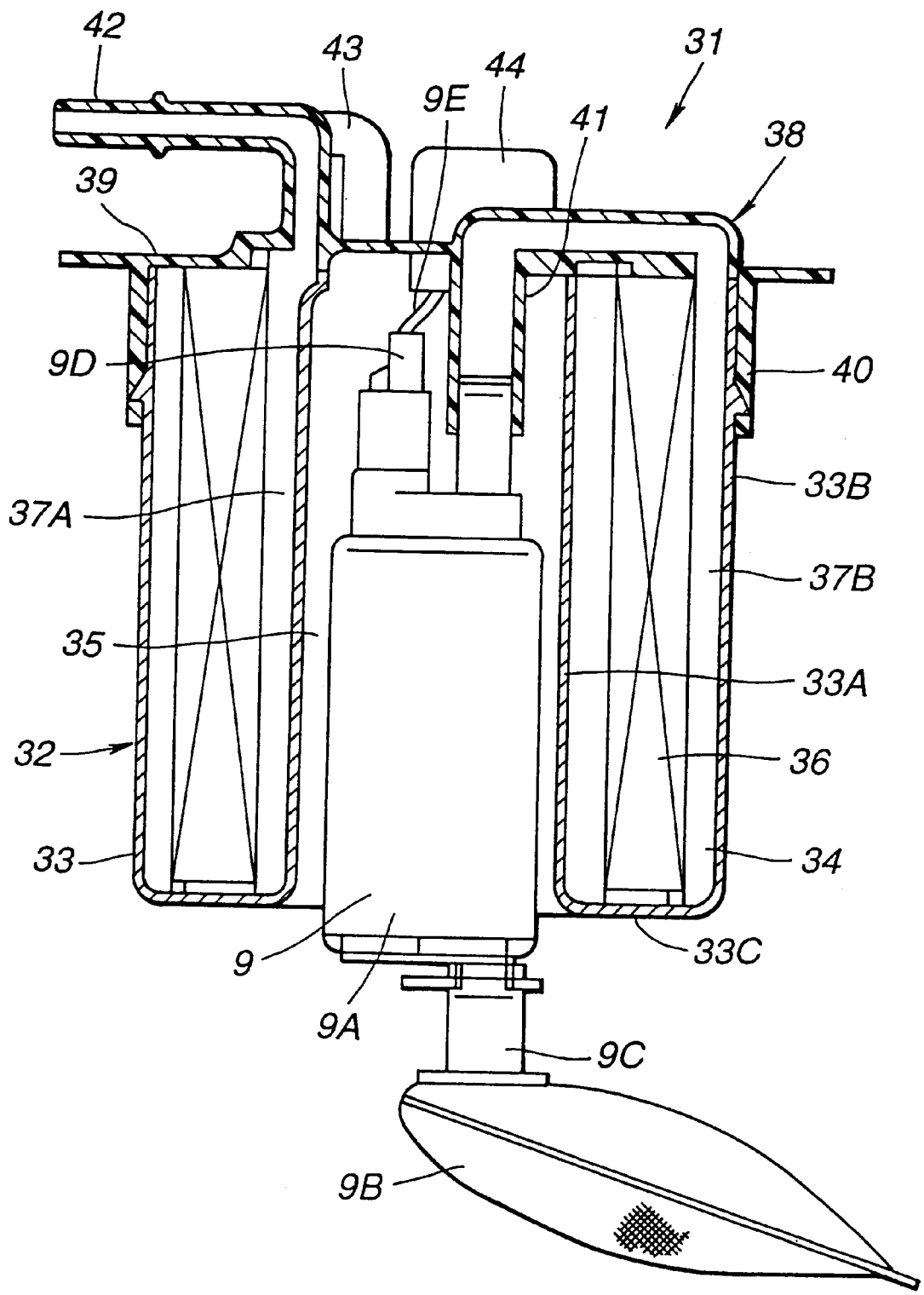
FIG. 4 is a longitudinal cross sectional view taken along the line IV—IV shown in FIG. 5 which shows the fuel supply device of the second embodiment.
Figure 5:
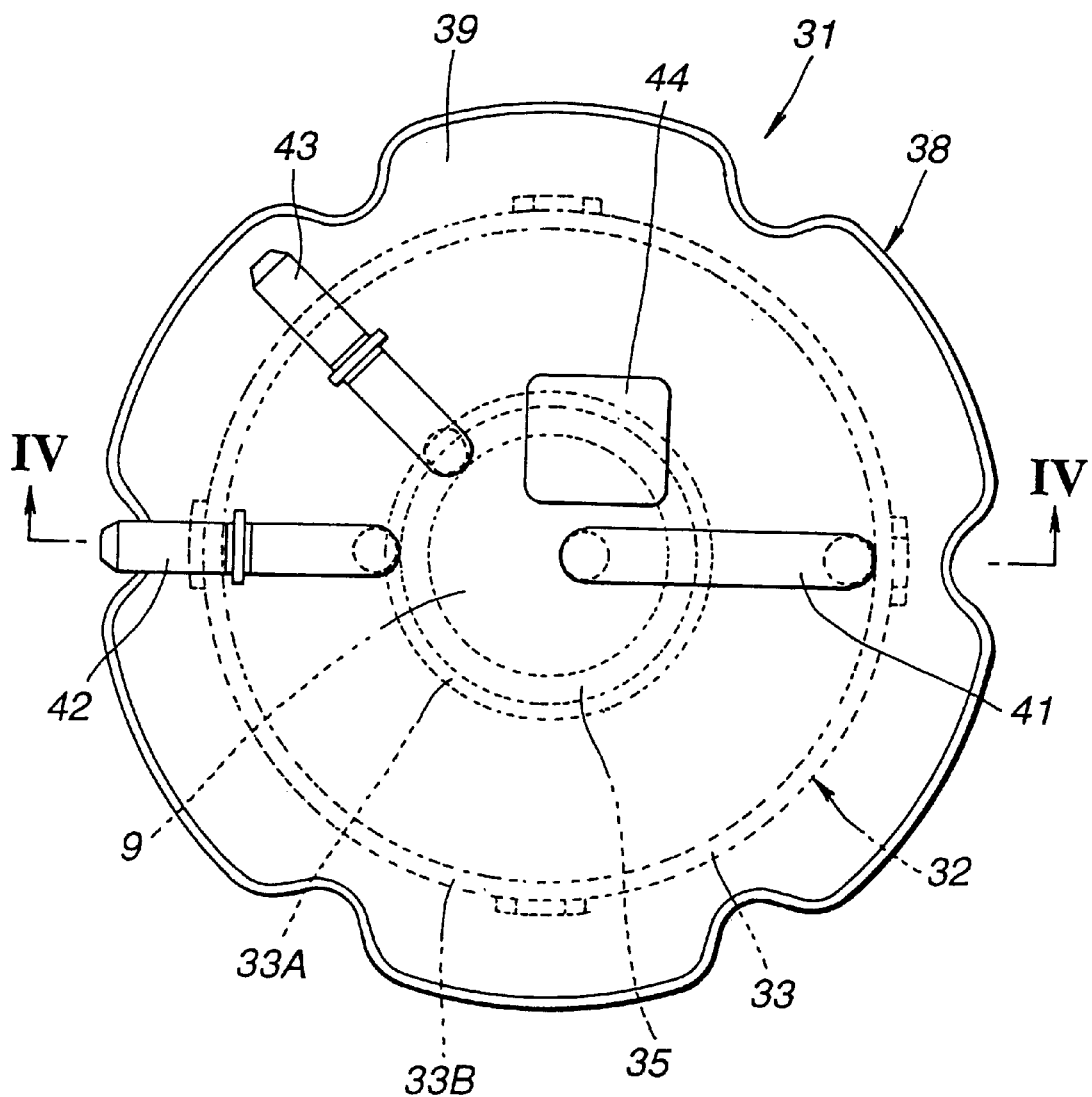
FIG. 5 is a plan view illustrating the supply unit of the fuel supply device of FIG. 4.

Referring now to FIGS. 4 and 5, there is shown the second embodiment of the present invention. The second embodiment is characterized in that the outer periphery of the fuel pump is surrounded by the inside wall portion of the filter case formed as a double cylinder. In this embodiment, the same signs used to designate elements in the first embodiment will be applied to the corresponding elements used in the second embodiment, and thus detailed description of these elements will be omitted because the above description thereon seems to be self-explanatory.

In the drawings, reference sign 31 denotes the supply unit of the second embodiment. In the same manner as the first embodiment, the supply unit 31 is constructed by the fuel pump 9, the fuel filter 32, and a unit body 38 described later, on which the former two component parts are installed. In the second embodiment, the fuel filter 32 is formed annularly by a filter case 33 and a filter element 36, which will be hereinafter described, so that the fuel filter is disposed to surround the outer periphery of the fuel pump 9.

Reference sign 33 denotes the filter case formed as a double cylinder. As seen in FIG. 4, the filter case 33 is made of a material practically having an electric conductivity, and is formed with a cylindrical inside wall portion 33A surrounding the outer periphery of the fuel pump 9, a cylindrical outside wall portion 33B surrounding the inside wall portion 33A through the filter element 36, and a bottom wall portion 33C.

The filter case 33 is formed as an annular casing having an opening at its upper end, in such a manner as to define a filter accommodation space 34 between the inside wall portion 33A and the outside wall portion 33B.

Additionally, the filter case 33 is fitted at its upper end into the filter mounting portion 40 of the unit body 38, for installation of the filter case on the unit body 38. An annular inner space 35 is defined between the inside wall portion 33A of the filter case 33 and the outer periphery of the fuel pump 9, so that the fuel in the fuel tank 1 enters into or outgoes from the inner space 35 through the lower opening. Hereby, the filter case 33 is brought into contact with the fuel within the fuel tank 1 through the inside wall portion 33A, the outside wall portion 33B, and the bottom wall portion 33C.

Reference sign 36 denotes the annular filter element accommodated in the filter accommodation space 34 of the filter case 33. As seen in FIG. 4, the filter element 36 abuts at its upper end with the base portion 39 of the unit body 38, and abuts at its lower end with the bottom wall portion 33C of the filter case 33.

Also, an annular inner fluid chamber 37A is defined within the filter case 33 and between the filter element 36 and the inside wall portion 33A, whereas an annular outer fluid chamber 37B is defined between the filter element 36 and the outside wall portion 33B. The filter element 36 filtrates fuel flowing into the outer fluid chamber 37B and feeds the filtered fuel into the inner fluid chamber 37A, for purification of the fuel.

Reference sign 38 denotes the unit body of the supply unit 31. Almost in the same manner as the first embodiment, as shown in FIG. 5, the unit body 38 is constructed by a base portion 39 formed into a substantially circular plate, a filter mounting portion 40 projected downward from the base portion 39 just as seen in FIG. 4, and a fuel inlet port 41 integrally connected to the base portion 39 and having a substantially C-shaped cross section.

The fuel inlet port 41 projects, at its one end, downward from the central portion of the base portion 39, so that the discharge port 9D of the fuel pump 9 is fitted into the inner periphery of the fuel inlet port. The other end of the fuel inlet port 41 opens into the outer fluid chamber 37B of the filter case 33. Furthermore, as seen in FIG. 4, the base portion 39 is formed with a L-shaped fuel supply conduit 42 extending upwards and communicating with the inner fluid chamber 37A of the filter case 33, a return conduit 43 which is L-shaped, extending upwards at the upper end and extending downwards from the base portion 39 at the lower end, and a connector portion 44 of the fuel pump 9.

Thereby, the fuel of the fuel tank 1, discharged from the discharge port 9D of the fuel pump 9, flows through the fuel inlet port 41 into the outer fluid chamber 37B defined within the fuel filter 32, and filtrated by the filter element 36, and then the filtrated fuel flows out into the inner fluid chamber 37A and is supplied from the inner fluid chamber 37A via the fuel supply conduit 42 to the exterior of the fuel tank 1.

As set out above, with the arrangement of the second embodiment, it is possible to obtain essentially the same operations and effects as the first embodiment. That is, the static electricity charged in the filter case 33 can be escaped or released into the fuel in the fuel tank 1 through the inside wall portion 33A of the filter case 33, the outside wall portion 33B, and the bottom wall portion 33C.

Particularly, in the second embodiment, the device is constructed so that the fuel within the fuel tank 1 enters into and outgoes from the inner space 35 defined between the outer periphery of the fuel pump 9 and the inside wall portion 33A of the fuel filter 33 provided to surround the outer periphery of the fuel pump, whereby the adequate contact area enough to escape the static electricity can be provided between the filter case 33 and the fuel in the fuel tank 1.

Moreover, it is possible to greatly reduce undesired aperture defined between the fuel pump and the fuel filter, by disposing the fuel filter 32 in such a manner as to surround the outer periphery of the fuel pump 9. Thus, the supply unit 31 can be more compactly constructed.

Figure 6:
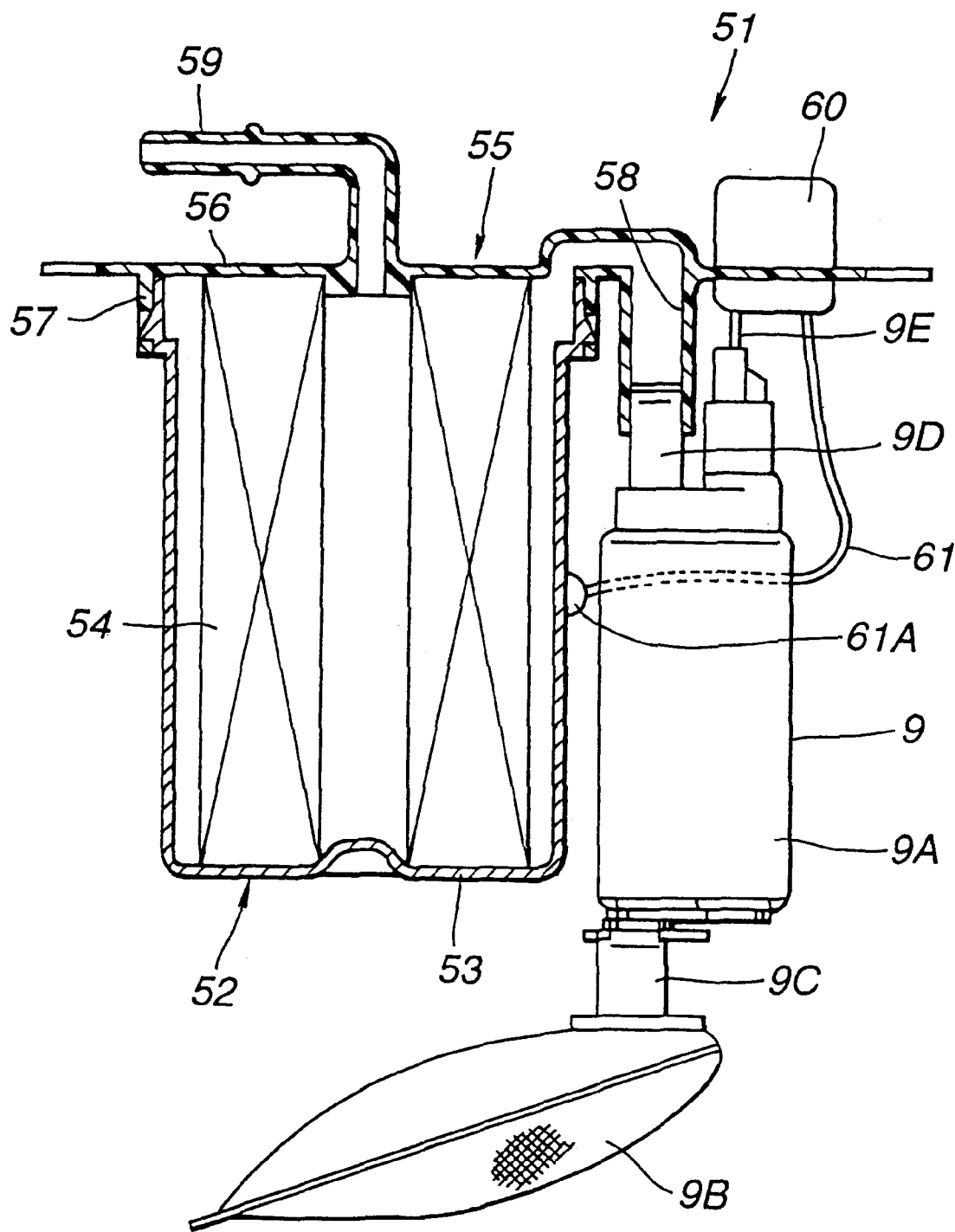
FIG. 6 is the illustration of the fuel supply device of the third embodiment, and showing the same longitudinal cross section as FIG. 4.

Referring now to FIG. 6, there is shown the third embodiment. The third embodiment is characterized in that a lead wire is installed on the filter case of the fuel filter, for releasing static electricity to the exterior. In this embodiment, the same signs used to designate elements in the first embodiment will be applied to the corresponding elements used in the third embodiment, and thus detailed description of these elements will be omitted because the above description thereon seems to be self-explanatory.

In the drawings, reference sign 51 denotes a supply unit of the third embodiment. In the same manner as the first embodiment, the supply unit 51 is constructed by the fuel pump 9, the fuel filter 52, and a unit body 55 described later on which the former two component parts are installed. In the third embodiment, the filter case 53 of the fuel filter 53 is connected through a lead wire 61 described later to the connector portion 60 of the unit body 55.

Almost in the same manner as the second embodiment, the fuel filter 52 is constructed by a filter case 53 made of a conducting material having an electric conductivity, such as metallic materials, and formed into a cylindrical shape with a bottom, and a cylindrical filter element 54 filtrating the fuel flowing from its outer peripheral side to its inner peripheral side.

Reference sign 5 denotes the unit body of the supply unit 51. Almost in the same manner as the first embodiment, the unit body 55 is equipped with a base portion 56 made of synthetic resin material having an electric insulation property, a filter mounting portion 57 into which the fuel filter is fitted, a fuel inlet port 58 intercommunicating the discharge port 9D of the fuel pump 9 and the outer peripheral side of the filter element 54, a L-shaped fuel supply conduit 59 communicating the inner peripheral side of the filter element 54, and a connector portion 60 whose upper end projects from the upper face of the fuel tank 1. The lead wire 9E of the fuel pump 9 is connected to the lower end of the connector portion.

Reference sign 61 denotes the lead wire serving as a conducting member. One end of the lead wire 61 is formed as a fixedly connected portion 61A which is fixedly connected to the outer peripheral surface of the filter case 53 of the fuel filter 52 by means of spot welding, soldering, or the like. The other end of the lead wire extends toward the connector 60 of the unit body 55, and then connected via the connector portion 60 to earth electrode (not shown) provided in the exterior of the fuel tank 1. In the case that the fuel tank 1 is made of metal, the other end of the lead wire 61 may be connected to the upper portion of the fuel tank 1 (for example, the lid plate 1A).

With the previously-described arrangement of the third embodiment, it is possible to obtain essentially the same operations and effects as the first embodiment. That is, the static electricity charged in the filter case 53 can be escaped into the exterior of the fuel tank 1 through the lead wire 61 and the connector portion 60. Particularly, in the third embodiment, there is no necessity for the increased contact area between the filter case 53 and the fuel in the fuel tank 1, and thus the external shape of the fuel filter 52 can be small-sized, and whereby the supply unit 51 can be compactly designed.

Additionally, the earth terminal of the connector portion 60 is used commonly to both the lead wire 61 of the fuel filter 52 and the lead wire 9E of the fuel pump 9, the supply unit 51 can be easily constructed with not so much changes in specification with respect to a conventional device.

Figure 7:
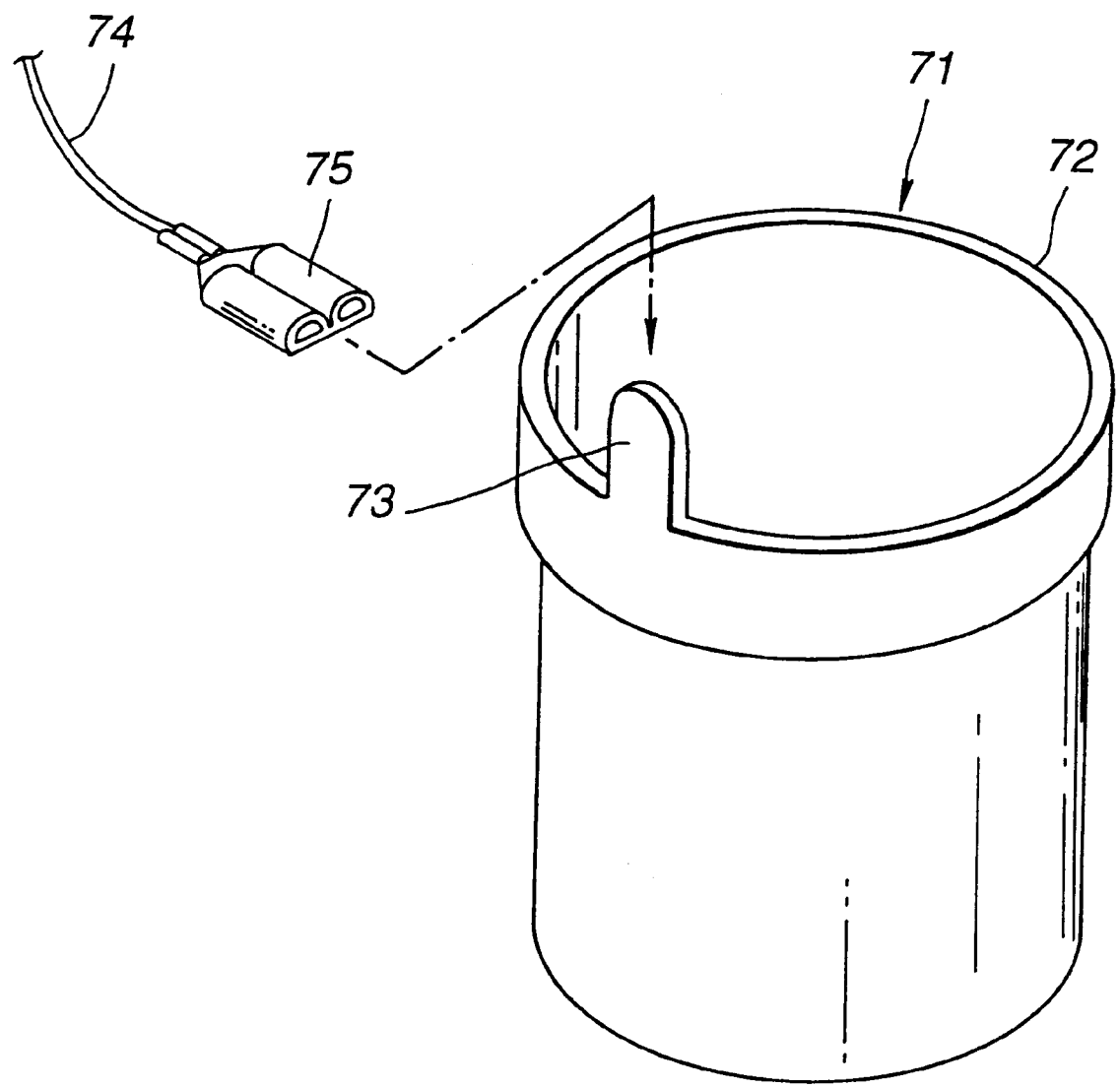
FIG. 7 is a perspective view illustrating a filter case and the like, contained in the fuel supply device of the fourth embodiment.

Referring now to FIG. 7 there is shown the fourth embodiment. In this embodiment, the same signs used to designate elements in the third embodiment will be applied to the corresponding elements used in the fourth embodiment, and thus detailed description of these elements will be omitted because the above description thereon seems to be self-explanatory. The fourth embodiment is characterized in that a connector engaged portion 73 is projected from and formed integral with a filter case 72 of a fuel filter 71, and that a connector portion 75 is attached to a lead wire 74 of the connector portion 60 of the unit body 55, and that the connector 75 and connector engaged portion 73 are detachably connected to each other.

With the previously-noted arrangement of the fourth embodiment, it is possible to obtain essentially the same operations and effects as the third embodiment. Particularly, in the fourth embodiment, the lead wire 74 is not fixedly connected to the filter case 72 of the fuel filter 71, and thus only the fuel filter 71 can be easily detached with respect to the supply unit 51 by removing the connector 75 from the connector engaged portion 73 when replacing the fuel filter 71 with a new part. This enhances the workability, and also reduces replacement costs of the fuel filter 71.

Figure 8:
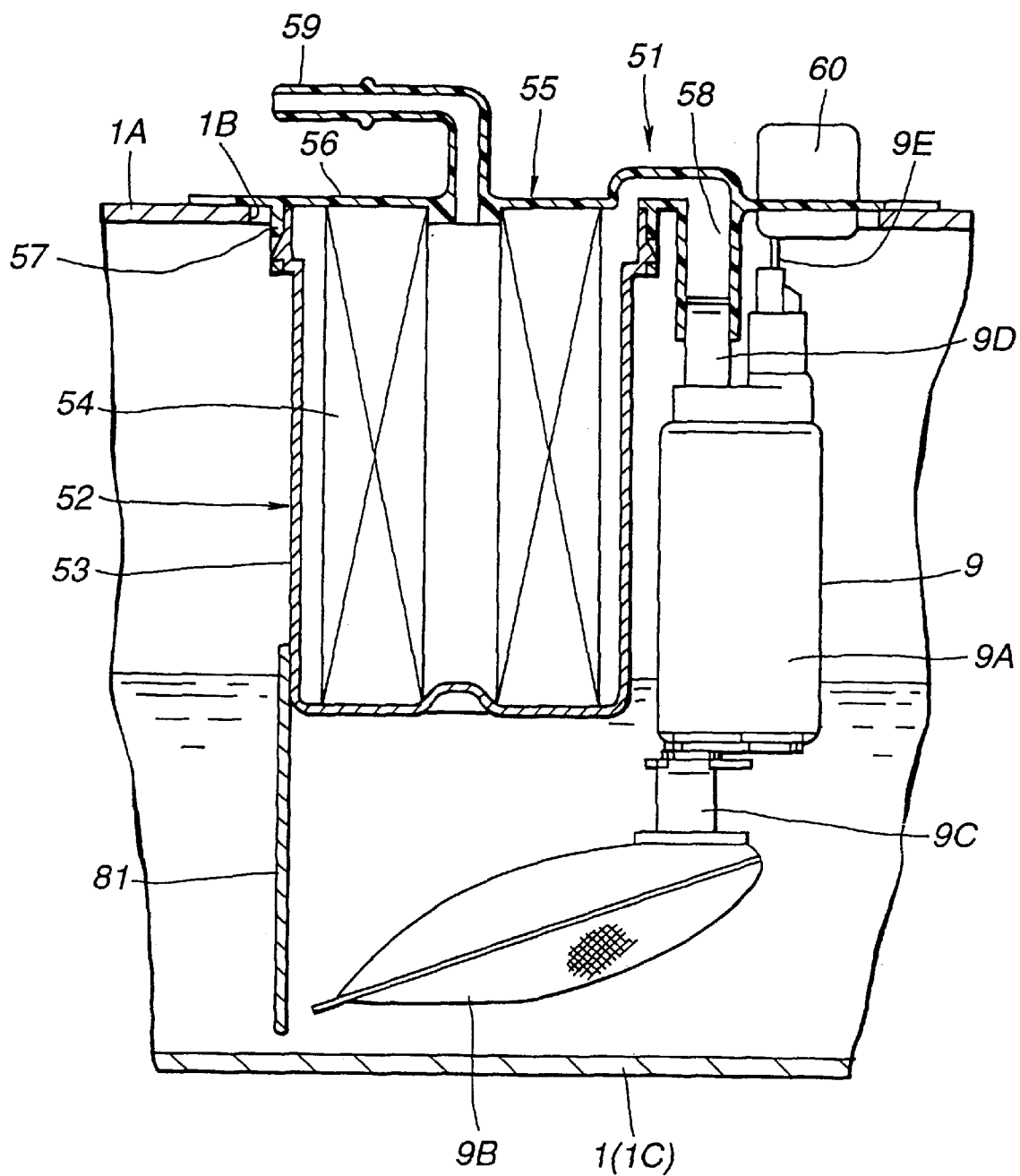
FIG. 8 is a longitudinal cross sectional view illustrating the fuel supply device of the fifth embodiment.

Referring now to FIG. 8, there is shown the fifth embodiment. In this embodiment, the same signs used to designate elements in the third embodiment will be applied to the corresponding elements used in the fifth embodiment, and thus detailed description of these elements will be omitted because the above description thereon seems to be self-explanatory. The fifth embodiment is characterized in that the filter case 53 of the fuel filter 52 is formed with an electric conductor 81.

Herein, the electric conductor 81 is made of metallic materials, electrically conducting synthetic resin, or the like, and formed into a bar-like shape or a wire-like shape. One end of the electric conductor is connected to the outer side wall of the filter case 53 by means of bonding, welding, soldering, or the like. The other end of the electric conductor 81 is formed as a conducting member vertically suspended and coming down to the bottom portion 1C of the fuel tank 1 for escaping static electricity charged in the filter case 53 into the surrounding fuel.

With the previously-noted arrangement of the fifth embodiment, it is possible to obtain the same operations and effects as the first and third embodiments. That is, the static electricity charged in the filter case 53 can be escaped into the surrounding fuel through the outer side wall of the filter case and the electric conductor 81. Particularly, in the case that the moisture or the like is accumulated in the bottom portion 1C of the fuel tank 1, the static electricity charged in the filter case 53 can be effectively released from the tip end of the electric conductor 81 into the moisture.

Figure 9:
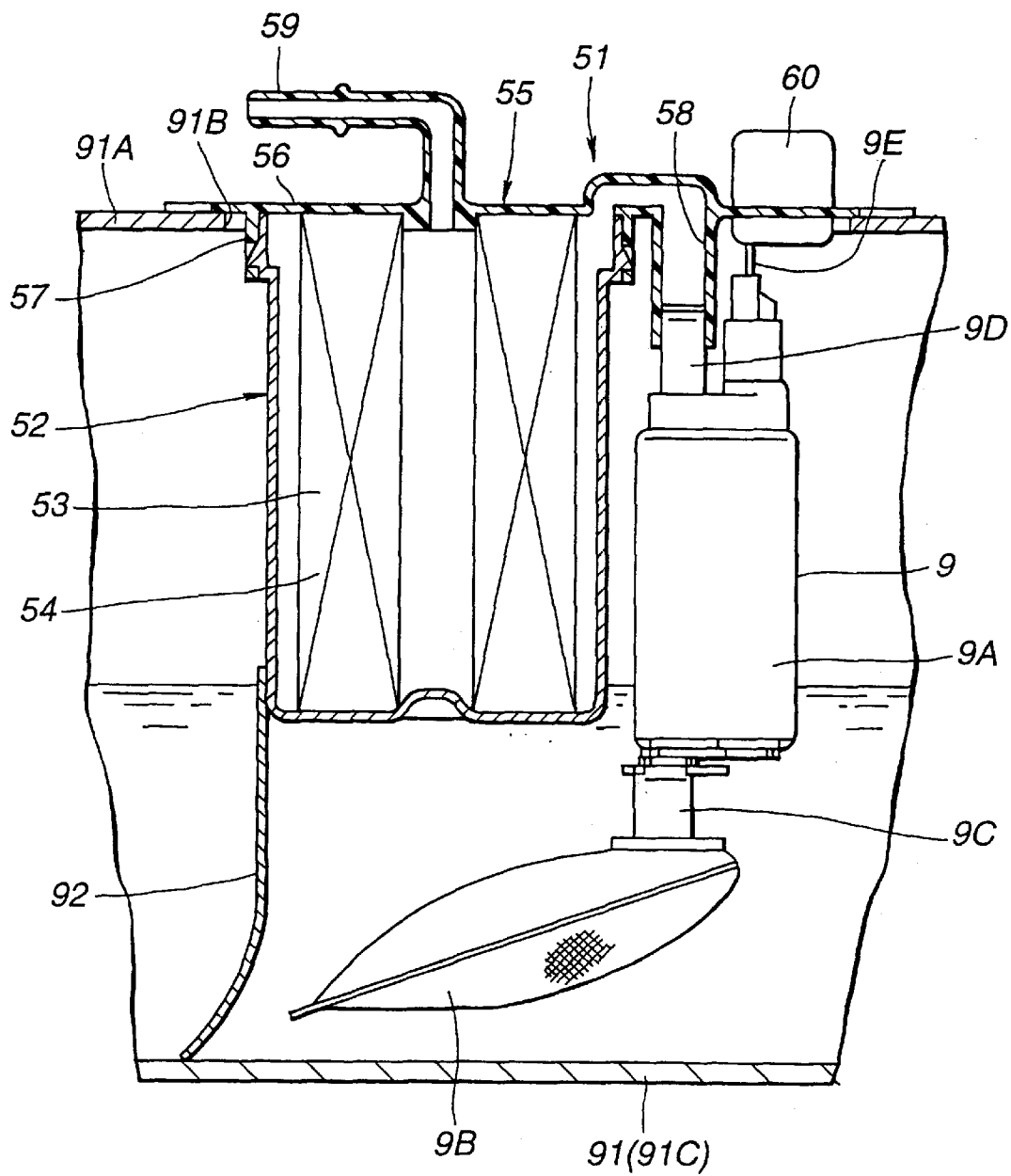
FIG. 9 is a longitudinal cross sectional view illustrating the fuel supply device of the sixth embodiment.

Referring now to FIG. 9, there is shown the sixth embodiment. In this embodiment, the same signs used to designate elements in the third embodiment will be applied to the corresponding elements used in the sixth embodiment, and thus detailed description of these elements will be omitted because the above description thereon seems to be self-explanatory. The sixth embodiment is characterized in that the filter case 53 of the fuel filter 52 is connected via an electric conductor 92 to a bottom portion 91C of a fuel tank 91.

Herein, the fuel tank 91 is made of metallic material or electrically conducting synthetic resin or the like. The bottom portion 91C of the fuel tank has an electric conductivity. The electric conductor 92 is also made of metallic material or electrically conducting synthetic resin or the like, and formed as a wire having a flexibility. One end of the electric conductor is attached to the outer side wall of the filter case 53 by means of bonding, welding, soldering, or the like. The other end of the electric conductor 92 contacts with the bottom portion 91C of the fuel tank 91, so that the electric conductor constructs the conducting member required for escaping the static electricity charged in the filter case 53 toward the fuel tank 91.

With the previously-discussed arrangement of the sixth embodiment, it is possible to obtain the same operations and effects as the third embodiment. For example, when the fuel tank 91 made of metal is used, the static electricity charged in the filter case 53 can be released from the electric conductor 92 through the fuel tank 91 to the outside earth.

Figure 10:
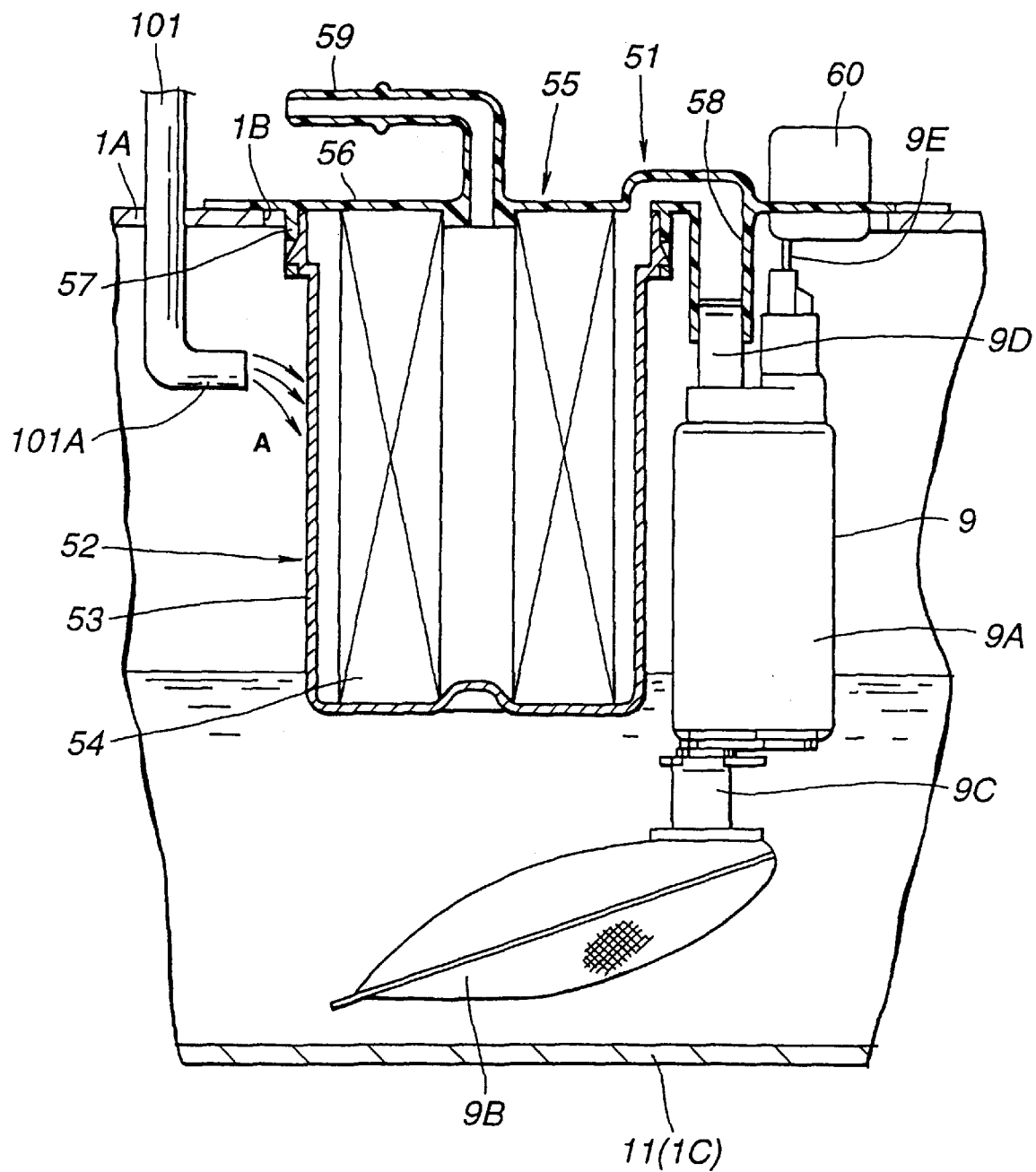
FIG. 10 is a longitudinal cross sectional view illustrating the fuel supply device of the seventh embodiment.

Referring now to FIG. 10, there is shown the seventh embodiment. In this embodiment, the same signs used to designate elements in the first and third embodiments will be applied to the corresponding elements used in the seventh embodiment, and thus detailed description of these elements will be omitted because the above description thereon seems to be self-explanatory. The seventh embodiment is characterized in that fuel, returned from an outflow port 101A of a return conduit 101 into the fuel tank 1, comes into contact with the filter case 53 of the fuel filter 52, so that the filter case is wetted by the returned fuel.

Herein, the return conduit 7 of the first embodiment is replaced by the return conduit 101. One end of the return conduit is connected to the pressure regulator 6. The other end of the return conduit 101 is curved into a L shape within the fuel tank 1, to form the outflow port 101A which opens toward the outer side wall surface of the filter case 53 of the fuel filter 52.

As indicated by the arrow A of FIG. 10, when the fuel, returned from the pressure regulator 6 through the return conduit 101 into the fuel tank 1, gushes out from the outflow port 101A, comes into contact with the outer side wall surface of the filter case 53, with the result that the static electricity charged in the filter case 53 can be discharged through the wetted portion due to the returned fuel into the fuel stored in the fuel tank 1.

With the previously-discussed arrangement of the seventh embodiment, it is possible to obtain the same operations and effects as the first and third embodiments. Specifically, in the seventh embodiment, even when the liquid level of the fuel in the fuel tank 1 is a comparatively low level, the static electricity charged in the filter case 53 can be released through the fuel returned from the return conduit 101 into the fuel in the fuel tank 1.

In the third embodiment described above, one end of the lead wire 61 is fixed to the filter case 53 of the fuel filter 52 through the fixedly connected portion 61A. In this case, the other end of the lead wire 61 may be detachably connected to the connector portion 60 of the unit body 55 by way of the same connector as the connector 75 used in the fourth embodiment.

As detailed above, according to the invention described in claim 1, the fuel filter, consisting of the electrically conducting filter case and the filter element, is provided in the fuel tank, and the inside and outside wall portions of the filter case are in contact with fuel stored in the fuel tank, and thus the filter case and the fuel stored in the fuel tank can be contacted with each other with the adequately great contact area through the inside and outside wall portions. Therefore, the static electricity charged in the filter case can be effectively escaped through at least the inside wall portion and the outside wall portion into the fuel, utilizing the slight electric conductivity that the fuel stored in the fuel tank has. This prevents static electricity from being accumulated in the filter case, thus enhancing the reliability of the fuel supply device.

According to the invention described in claim 2, the filter case is formed into a substantially U shape in lateral cross section together with the filter element, and the device is constructed in such a manner as to permit the fuel to flow into the inside wall portion of the filter case at a position where the filter case is opposed to the outer periphery of the fuel pump. Thus, the outside and inside wall portions of the filter case are curved and formed into a substantially U shape, thereby certainly increasing the surface area of these wall portions. Also, under the condition where the filter case and the fuel tank are integrally assembled to each other, it is possible to create an adequate contact area, enough to release static electricity, between the filter case and the fuel stored in the fuel tank. This enhances the reliability of the fuel supply device. Additionally, both ends of the substantially U-shaped fuel filter whose central portion (in the longitudinal direction) is curved, can be arranged to be opposed to the outer periphery of the fuel pump, and thus unnecessary aperture defined therebetween can be reduced, and also the fuel pump and the fuel filter can be compactly integrally assembled to each other.

Furthermore, according to the invention described in claim 3, the filter case is formed as a double cylinder, so that its inside wall portion surrounds the outer periphery of the fuel pump with an aperture. Therefore, the surface area of the filter case can be enlarged by producing the filter case so that the inside and outside wall portions of the filter case have a cylinder diameter greater than that of the fuel pump. Under the condition where the filter case and the fuel pump are integrally assembled to each other, it is possible to create an adequate contact area, enough to release static electricity, between the filter case and the fuel stored in the fuel tank. This enhances the reliability of the fuel supply device. Additionally, the fuel filter can be arranged in such a manner as to surround the outer periphery of the fuel pump, and thus undesired aperture defined therebetween can be greatly reduced, and it is possible to create an adequate contact area, enough to release static electricity, between the filter case and the fuel stored in the fuel tank. This enhances the reliability of the fuel supply device.

On the other hand, according to the invention described in claim 4, the fuel filter, consisting of the filter case having an electric conductivity and the filter element, is provided within the fuel tank, and the conducting member used for escaping static electricity to the exterior is provided in the filter case. Accordingly, the static electricity charged in the filter case can be released through the conducting member to the outside earth, and thus the reliability of the fuel supply device can be enhanced without performing great changes in specification with respect to a conventional device.

According to the invention described in claim 5, static electricity charged in the filter case is escaped through the lead wire to the upper side of the fuel tank. Therefore, the static electricity charged in the filter case can be stably escaped from the lead wire through the upper side of the fuel tank to the outside earth. This prevents the filter case from being held in the charged state with static electricity.

Furthermore, according to the invention described in claim 6, the conducting member is constructed by an electric conductor vertically suspended and coming down close to the bottom portion of the fuel tank. Therefore, static electricity charged in the filter case can be released through its outer side wall and the electric conductor into the surrounding fuel. Particularly, in the case that the moisture or the like is accumulated in the bottom portion of the fuel tank, the static electricity charged in the filter case can be effectively released from the tip end of the electric conductor 81 into the moisture.

Moreover, according to the invention described in claim 7, the outer side wall of the filter case and the bottom portion of the fuel tank are connected through the electric conductor. For example, in the case that the fuel tank, made of metal, is used, static electricity charged in the filter case can be released from the electric conductor through the fuel tank to the outside earth.

On the other hand, according to the invention described in claim 8, the fuel, returned through the return conduit to the fuel tank, comes into contact with the outer side wall surface of the filter case, so that the filter case is wetted by the returned fuel. Therefore, the static electricity charged in the filter case can be released through the returned fuel into the fuel stored in the fuel tank.

INDUSTRIAL APPLICABLE FIELD

As set forth above, the fuel supply device according to the invention is widely applicable to a device for supplying fuel stored in a fuel tank into an engine, such as an automobile engine, a marine engine, or the like.

What is claimed is:

1. A fuel supply device for use in a fuel tank, comprising:

a fuel pump, and a fuel filter arranged about the fuel pump for filtering the fuel discharged from the fuel pump, said fuel filter consisting of a filter case and a filter element disposed in the filter case, said filter case being made of an electrically conductive material and formed with an inside wall portion and an outside wall portion, both of which are adapted to be in contact with fuel in the fuel tank, and which define a filter accommodation space therebetween, the filter case having a substantially U-shaped cross section, so that the filter case encloses the pump in a spaced, contact-free relationship and permits fuel to flow freely in and out of all parts of a space defined between the inside wall portion and an outer periphery of the fuel pump.

2. The fuel supply device as claimed in claim 1, wherein the filter case is formed as a double cylinder, so that the inside wall portion cylindrically surrounds the outer periphery of the fuel pump in a spaced contact-free relationship therewith, and wherein the outside wall portion cylindrically surrounds an outer periphery of the inside wall portion and encloses the filter element.

* * * * *